United States Patent [19]

Yukitake et al.

[11] Patent Number: 5,369,449
[45] Date of Patent: Nov. 29, 1994

[54] METHOD FOR PREDICTING MOVE COMPENSATION

[75] Inventors: Takeshi Yukitake; Shuji Inoue, both of Yokohama, Japan

[73] Assignee: Matsushita Electric Industrial Co., Ltd., Osaka, Japan

[21] Appl. No.: 970,046

[22] Filed: Nov. 2, 1992

[30] Foreign Application Priority Data

Nov. 8, 1991 [JP] Japan ................ 3-293004
Jul. 9, 1992 [JP] Japan ................ 4-181980

[51] Int. Cl.⁵ ............................ H04N 7/137
[52] U.S. Cl. ............................ 348/699; 348/416
[58] Field of Search .......... 358/105, 133, 136; 348/413, 416, 699; H04N 7/137

[56] References Cited

U.S. PATENT DOCUMENTS

| | | | |
|---|---|---|---|
| 4,691,230 | 9/1987 | Kaneko et al. | 348/699 |
| 4,864,294 | 9/1989 | Gillard . | |
| 4,989,089 | 1/1991 | Chantelou et al. . | |
| 4,998,168 | 3/1991 | Gillard | 348/699 |
| 5,049,991 | 9/1991 | Niihara | 358/105 |
| 5,093,720 | 3/1992 | Krause et al. | 358/133 |
| 5,105,271 | 4/1992 | Niihara | 358/105 |
| 5,132,792 | 7/1992 | Yonemitsu et al. | 358/105 |
| 5,144,427 | 9/1992 | Kitaura et al. | 358/105 |
| 5,162,907 | 11/1992 | Keating et al. | 358/105 |
| 5,175,618 | 12/1992 | Ueda et al. | 358/105 |
| 5,191,414 | 3/1993 | Sugiyama . | |
| 5,200,820 | 4/1993 | Gharaui | 358/105 |
| 5,210,605 | 5/1993 | Zaccarin et al. | 358/105 |

FOREIGN PATENT DOCUMENTS

| | | |
|---|---|---|
| 0395271A2 | 10/1990 | . |
| 0395440A2 | 10/1990 | European Pat. Off. . |
| 0447068A2 | 9/1991 | European Pat. Off. . |
| 0484140A2 | 5/1992 | European Pat. Off. . |

OTHER PUBLICATIONS

A. Puri, et al, "Video Coding with Motion-Compensated Interpolation for CD-ROM Applications", Signal Processing. Image Communication, vol. 2, No. 2, pp. 127–144, Aug. 1990.

K. Kinuhata, et al, "Universal Digital TV Codec-Unicodec", 7th International Conference on Digital Satellite Communications, May 1986, pp. 281–288.

M. Hoetter, "Differential Estimation of the Global Motion Parameters Zoom and Pan", Signal Processing. European Journal Devoted to the Methods and Applications of Signal Processing, vol. 16, No. 3, Mar. 1989, pp. 249–265.

Patent Abstracts of Japan, vol. 016, No. 097 (E-1176) 10 Mar. 1992 & JP-A-03 276 988 (Victor Company of Japan Ltd) 9 Dec. 1991.

"Transmission of Component-Coded Digital Television Signals for Contribution-Quality Applications of the Third Hierarchical Level of CCITT Recommendation G.702," CCITT Recommendation 723 of CMTT.

Takeshi Yukitake, "Field-Time Adjusted MC for Frame-Base Coding (2)" International Organization for Standardization ISO/IEC/JTCI/SC29/WG11 MPEG92/100, Mar. 11, 1992.

Takeshi Yukitake, "Field-Time Adjusted MC for Frame-Base Coding" CCITT SGXV Working Party XV/1 Experts Group for ATM Video Coding, AV-C-194 MPEG 92/024s, Dec. 1991.

Shiji Inoue, et al "Motion Compensation Method for Interlace Video" Spring conference of the Institute of Electronics Information and Communication Engineers of Japan, 1992.

*Primary Examiner*—Tommy P. Chin
*Assistant Examiner*—Richard Lee
*Attorney, Agent, or Firm*—Stevens, Davis, Miller & Mosher

[57] ABSTRACT

A method for predicting move compensation of an input image based on a move vector of the input image from this input image to a reference image which has been sampled at a first set time, and the method includes calculating a move vector of the input image based on a move, at a second set time, of a block unit which is a part of the input image and consists of a plurality of pixels, and calculating a move vector of the reference image based on a move, at the first set time, of a block unit which is a part of the reference image and consists of a plurality of pixels. Move compensation of the input image is calculated both from the move vector of the input image and from the move vector of the reference image, to thereby realize a method for predicting move compensation with high precision.

6 Claims, 6 Drawing Sheets

MOVE COMPENSATION WHEN AN INTERFACE SIGNAL IS HANDLED AS A FRAME (WHEN THE VERTICAL COMPONENT OF THE MOVE VECTOR IS −1)

MOVE COMPENSATION WHEN FIG. 7B IS CONSIDERED AT A CORRECT SAMPLING POSITION (WHEN THE VERTICAL COMPONENT OF THE MOVE VECTOR IS −1)

METHOD FOR PREDICTING MOVE COMPENSATION

BACKGROUND OF THE INVENTION

1. Field of the Invention

The present invention relates to a method for predicting move compensation of a dynamic image to be utilized in an apparatus which requires a prediction of a dynamic image such as an image transmission apparatus and an image compression apparatus.

2. Description of the Prior Art

With the progress of semiconductor technologies, methods for predicting move compensation to be utilized for a transmission of an image and a compression of an image have been widely used in many fields in the recent years. Among such conventional methods for compensating a move of a dynamic image, there is one method for compensating a move of a dynamic image based on one piece of reference image.

FIG. 6 is a diagram for showing the concept of the conventional method for compensating a move of an image. Referring to FIG. 6, a dynamic image signal is a set of images which are sampled with an equal time interval t0 on the time axis. For example, an NTSC signal has images sampled at every 1/60 second for each field and a PAL signal has images sampled at every 1/50 second for each field. When a certain object of which images are to be picked up is moving, for example, the spatial position of an object A in an M-th image is deviated from the spatial position of an object A' in an (M−1)-th image by a portion of a move of the object during a period of t0. Now, consider a case for predicting the M-th image from the (M−1)-th image. In order to make a prediction of the M-th image with a high level of precision by compensating a move of the object from an input image to a reference image during a time difference of t0, the M-th image is divided into blocks including at least one pixel, and a move of each block from the (M−1)-th image to the M-th image is detected so that a pixel value of the image at a position deviated by the portion of this move is set as a predicted value. This will be explained with reference to FIG. 6. To obtain a predicted value of a pixel X of the M-th image, a pixel X' at the same spatial position as the spatial position of the pixel X in the (M−1)-th image is deviated by a detected move MV of a block unit including the pixel X', so that a pixel X" is obtained. This pixel X" is then used as a predicted value of the pixel X. In FIG. 6, the block is assumed to have a size of 3×3.

When a signal is an interlace signal, there are many alternative cases considered for predicting compensation of a move of an image. For example, either a frame or a field is used for the image, and a frame is used for a reference image and a field is used for an input image, etc. The basic principle is as explained with reference to FIG. 6 above. As one of the examples of the above method for predicting move compensation, there is Recommendation 723, "Transmission of component-coded digital television signals for contribution-quality at the third hierarchical level of CCITT Recommendation G.702" which was standardized by the CMTT (Commission Mixte CCIR/CCITT pour les Transmissions Televisuelles et Sonores 3). In this recommendation, a prediction of move compensation between frames and a prediction of move compensation between fields are suitably changed over between the two cases. As described above, according to the conventional method for predicting move compensation of an image, a prediction is made by compensating a move of the image based on a detected move of the image. Therefore, the conventional predicting method can predict move compensation with a high level of precision even if an image is a dynamic image including movement.

The above-described conventional method for predicting move compensation, however, has problems that it is not possible to accurately predict move compensation and that, even if it is possible to make a correct prediction of move compensation, the image density of an image to be referred to becomes the image density of a reference image, which makes it impossible to make prediction at a higher level of precision.

For example, in the case of predicting move compensation by using an interlace signal as a frame and generating a block from this frame, frames are combined together to compensate a move of an image by disregarding a difference in sampling positions, due to a time difference, between two fields within a frame. Accordingly, when correct sampling positions of the fields are considered, there is such a case that moves compensated in the first field and moves compensated in the second field do not coincide with each other. An example of this case is shown in FIGS. 7A to 7C. Referring to FIGS. 7A to 7C, an input signal is an interlace signal (FIG. 7A). Interlace signals are combined together in a frame to predict move compensation. When a vertical component of a move detected now is 1, the first field of the M-th frame is predicted from the second field of the (M−1)-th frame and the second field of the M-th frame is predicted from the first field of the (M−1)-th frame, as shown in FIG. 7B. Moves in the correct field positions are shown in FIG. 7C. As is clear from FIG. 7C, the moves for effecting compensation in the first field of the M-th frame do not coincide with the moves for effecting compensation in the second field of the M-th frame. As explained above, when move compensation of an image is made by handling an interlace image as a frame, the moves for effecting compensation are different between the first field and the second field. In a vector in which this phenomenon occurs, there is a problem that the precision of the level of prediction is deteriorated.

Next, consider a case of predicting move compensation of an image as an image of a correct position without disregarding a time difference of sampling between images as described above. As examples of this case, there is a case where move compensation is predicted for an interlace signal by generating a block from a field, and a case where move compensation is predicted for a noninterlace signal. In the above cases, move compensation is predicted by using an image at a position of a correct time. Therefore, there arises no such problem which occurs in the case of predicting move compensation by generating a block from a frame of the interlace signal as described above. However, in this case, move compensation is predicted from one piece of reference image and the pixel density of an image to be referred to becomes the pixel density of the reference image, so that there is a limit to carrying out a prediction of move compensation at a higher level of precision. FIG. 8 shows a case of predicting move compensation by generating a block from a field for an input of an interlace signal. In this case, prediction of move compensation is carried out by using a field image as a reference image. Therefore, when a move vector is 0 there is no sampling point at a position necessary for making a prediction on the reference image and, accordingly, a pixel value, or a predicted value, must be calculated by an interpolation within the field, as shown in FIG. 8, for example. As compared with the case for compensating a move by generating a block based on a pixel value within a frame, the case for compensating a move based on the field has a pixel density in a vertical direction which is half of the pixel density in the case of compensating a move based on a frame. Thus, there is a limit to carrying out a prediction of move compensation at a high level of precision when move compensation is carried out based on a field. This problem also arises when move compensation is carried out by using a non-interlace signal as an input. In both cases, the pixel density of the image to be referred to becomes the pixel density of the reference image, and there is a limit to carrying out a prediction of move compensation at a higher level of precision.

SUMMARY OF THE INVENTION

With a view to eliminating the above-described problems of the prior-art technique, it is an object of the present invention to provide a method for predicting move compensation with a very high level of precision by utilizing a plurality of pieces of reference images.

In order to achieve the above-described object of the present invention, the method of the present invention predicts move compensation of an input image based on a move vector of a reference image from an original position of the reference image to a position of the reference image sampled at a first set time, and the method includes calculating a move vector of an input image by calculating a move at a second set time of a block unit which is a part of the input image and also consists of a plurality of pixels, and calculating a move vector of the reference image by calculating a move at the first set time of a block unit which is a part of the reference image and also consists of a plurality of pixels, to thereby calculate move compensation of the input image at a desired set time both from the move vector of the input image and from the move vector of the reference image.

Also, the method of the present invention predicts move compensation of a plurality of pieces of input images based on a move vector of a reference image from an original position of the reference image to a position of the reference image sampled at a first set time, and the method includes calculating move vectors of input images by calculating moves at a second set time of block units, each block forming a part of each input image and also consisting of a plurality of pixels, and calculating a move vector of the reference image by calculating a move at the first set time of a block unit which is a part of the reference image and also consists of a plurality of pixels, regarding these move vectors of the input images to be the same, to thereby calculate move compensation of the input images at a desired set time both from the move vectors of the input images and the move vector of the reference image.

Therefore, according to the present invention, a time position of a reference image is compensated by using a certain move vector depending on the need so that a plurality of pieces of reference images sampled at different times according to the move of a block unit, including at least one pixel, which is detected at a certain time interval, become images of the input image at the above time intervals from the position of the input image. Thus, it is possible to obtain a plurality of pieces of images at positions of the above-described time intervals from the position of the input image. By combining these images together, it is possible to obtain a reference image of high pixel density. Based on this reference image of high pixel density, a pixel value at a position compensated by the detected move portion is calculated and this is used as a predicted value. Accordingly, it is possible to predict move compensation at a very high level of precision.

Further, according to the present invention, a vector for carrying out compensation of a time position of the reference image can be calculated from a move of the image detected at a certain time interval, so that it is not necessary to detect again the move vector for correcting the time, and move compensation at a high level of precision can be ensured.

Further, by using an interlace signal as an input signal and using two fields in a certain frame for a reference image, it becomes possible to suitably apply the above method for predicting move compensation to a frame image, thus ensuring a prediction at a high precision level of move compensation based on a frame.

Further, since the same value is used for a block of each input image, of which whole or part of spatial position of each block is superposed, among blocks of a plurality of pieces of input images, as a move detected at a certain time interval in a block unit including at least one pixel, it is not necessary to carry out move detection a plurality of times for many blocks of the plurality of input images, thus ensuring a prediction of move compensation at a high level of precision.

DESCRIPTION OF THE PREFERRED EMBODIMENTS

Figure 1:
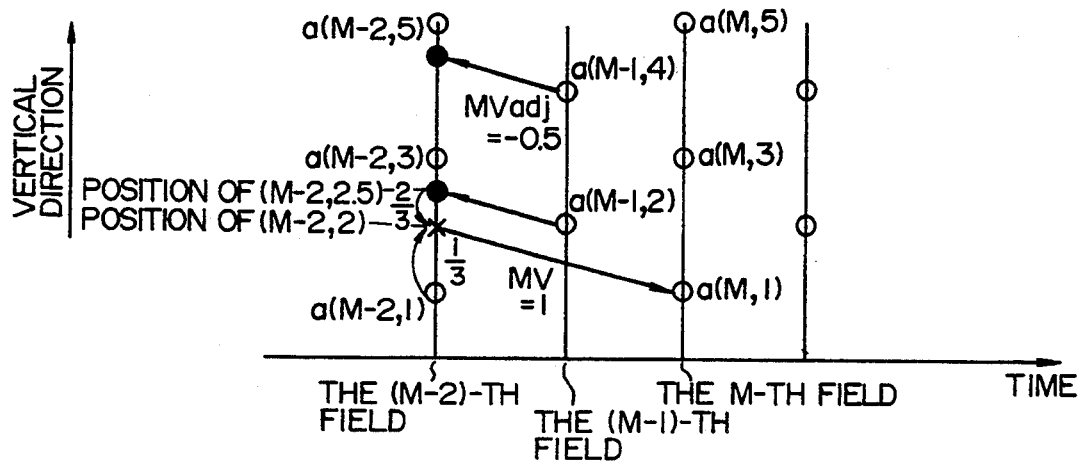
FIG. 1 is a diagram for explaining the first embodiment of the present invention.

FIG. 1 is a diagram for explaining a first embodiment of the present invention. FIG. 1 assumes the prediction of move compensation based on an interlace signal as an input signal so that a block is generated from an image within a field and a field image is used as a base. In this case, the input image is in the M-th field and a reference image is in both the (M−1)-th field and the (M−2)-th field. Now, assume that a move vector (MV) for predicting move compensation of a certain block is to be detected in a two-field instance, that is, between the M-th field and the (M−2)-th field. To simplify the explanation, of the detected moves, only the move in the vertical direction will be considered, and a pixel value is expressed as a(x, y). In this case, x represents a field number and y represents a line number. Line numbers are placed in the order of 1, 2, . . . , starting from the bottom in a line interval of the frame. A position of each pixel in a vertical direction is expressed always in the unit of a frame line.

Now, consider a case for obtaining a predicted value of (M, 1). When a vertical component of a detected MV is 1, a predicted value of move compensation of a (M, 1) becomes a pixel value at a position of (M−2, 2). Next, a time position is corrected so that the position of the reference image in the (M−1)-th field becomes an image at the position of the (M−2)-th field. A vector for correcting this time position is set as MV adj (adjustment vector). In calculating the MV adj from the MV, the following relationship can be easily drawn when it is assumed, for example, that moves from the (M−2)-th field to the M-th field are constant:

$$MV\ adj = -MV/2$$

Therefore, when the vertical component of the MV is 1, the vertical component of the MV adj becomes −0.5. When this is applied to the positional correction for correcting the positions of the (M−1)-th field to the positions of the (M−2)-th field, a (M−1, 2) in the (M−1)-th field is corrected to the position of (M−2, 2.5) in the (M−2)-th field, as shown in FIG. 1. After the above operation, the position of (M−2, 2) which is the predicted value of move compensation of the a (M, 1) is obtained from pixel values of the (M−2)-th field and the (M−1)-th field which is the result of a time positional correction. In this case, when a necessary pixel value is to be obtained by a weighted average, which is inversely proportional to a distance, from near-by pixel values, for example, the pixel value at the position of the (M−2, 2), that is the predicted value of move compensation of the a (M, 1), is obtained by the following expression:

$$a(M-2, 1)/3 + 2*a(M-1,2)/3$$

Although the above explains a prediction of move compensation taking account of only vertical components, a similar operation is also applied to the case for predicting move compensation for an image having both vertical and horizontal components.

As described above, according to the first embodiment of the present invention, a time position of a reference image is corrected by using a move vector as required so that a plurality of pieces of reference images sampled at different times become an image at a time which is positioned within a certain time interval from the position of the input image, according to detected moves at the above time interval of a block unit including at least one pixel. Therefore, it is possible to obtain a plurality of pieces of images at positions which are separated from the input image by the above time intervals. A reference image with high pixel density is obtained by combining these pieces of images, and a pixel value at a position which compensates the detected move is calculated by using the reference image of high pixel density, and the calculated pixel value is used as a predicted value. As a result, there is an effect that it is possible to carry out a prediction of move compensation of an image at a very high precision level.

The assumptions used in the above description of the first embodiment are flexible and the following alternative assumptions can also be accepted. Instead of assuming two images for a reference image, any plurality of number of pieces of images can also be used. Instead of assuming the positions of the plurality of reference images as its previous image and the previous image, these positions can also be set flexible. Instead of assuming a constant move of an image for calculating the MV adj from the MV, any assumption of a move can also be used according to a certain rule for calculating the MV adj from the MV. Instead of using a weighted average which is inverse proportional to a distance from near-by pixel values to obtain a pixel value at a necessary position, a coefficient of a low-pass filter, for example, can also be used to obtain the pixel value at a necessary position. Instead of using interpolation for obtaining a necessary pixel value, extrapolation, for example, can also be used to obtain the necessary pixel value.

Further, although the vector M adj for correcting positions of a plurality of pieces of reference images is calculated from a move vector MV which is detected in a block unit in the above-described first embodiment of the present invention, the MV can also be detected independently between the (M−1)-th field and the (M−2)-th field. In this case, by an independent detection of the MV, the time correction can be effected based on a more accurate move of the image. Thus, this method has an effect that a prediction of move compensation of an image at a higher level of precision can be ensured.

Further, although an interlace signal is used as an input signal and a field image is assumed as each image in the above-described first embodiment of the present invention, a non-interlace image can also be used, with an effect that a prediction of move compensation of an image can be ensured at a higher level of precision, for the same reason as explained above.

Figure 2A:
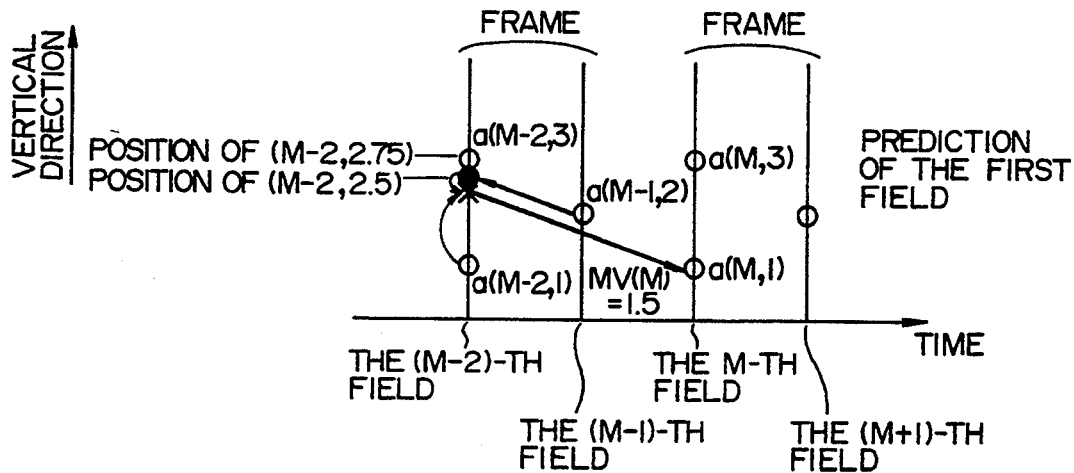
FIGS. 2A and 2B are diagrams for explaining the second embodiment of the present invention.
Figure 2B:
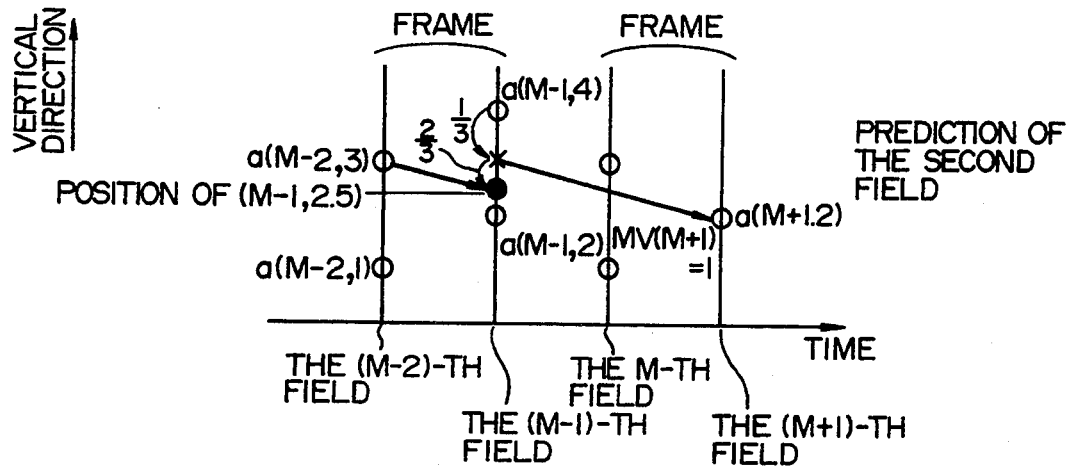

Next, a second embodiment of the present invention for predicting move compensation of an image by using an interlace signal as an input signal and using a frame as an input, will be explained. FIGS. 2A and 2B are diagrams for explaining the second embodiment of the present invention. Referring to FIGS. 2A and 2B, a reference image is in two fields of the previous frame, that is, the (M−1)-th field and the (M−2)-th field, and an input image is in two fields of the current frame, that is, the M-th field and the (M+1)-th field. In FIGS. 2A and 2B, it is assumed that a move vector for predicting move compensation of a certain block is obtained within an input image and a reference frame and between fields of the same phase as that of the M-th field, for each two fields of the current frame. The move vector for predicting move compensation of the M-th field is expressed as MV(M) and the move vector for the (M+1)-th field is expressed as MV(M+1). A pixel value of each pixel position is expressed in the same manner as that of the first embodiment. To simplify the explanation of FIGS. 2A and 2B, of the detected moves, only the move in the vertical direction will be considered.

In FIGS. 2A and 2B, a prediction of a pixel within the M-th field is carried out by using images in the (M−1)-th field and the (M−2)-th field, in exactly the same operation as that of the first embodiment of the present invention. For example, when the vertical component of the MV(M) is 1.5, the predicted value of a(M, 1) becomes the pixel value at the position of (M−2, 2.5) according to the operation which is the same as that of the first embodiment, and this value is obtained by the following expression:

$$a(M-2, 1)/7 + 6*a(M-1, 2)/7$$

Similarly, in the same manner as that of the prediction of a pixel within the M-th field, a pixel within the (M+1)-th field is predicted from the two fields of the reference frame, that is, the (M−1)-th and (M−2)-th fields. The method of prediction in this case is the same as the method for predicting a pixel within the M-th field, except that the (M−2)-th field needs to be corrected to the position of the (M−1)-th field. A vector for correcting this time position is set as MV adj (M+1). In calculating the MV adj (M+1) from the MV(M+1), when the moves from the (M−2)-th field to the (M+1)-th field, for example, are constant, the following relationship can be obtained easily:

$$MV\ adj\ (M+1) = MV(M+1)/2$$

Therefore, when the vertical component of the MV(M+1) is 1, the vertical component of the MV adj (M+1) becomes 0.5. As shown in FIGS. 2A and 2B, when the (M−2)-th field is positionally corrected to the position of the (M−1)-th field, the a(M−2, 3) is positionally corrected to the position of th (M−1, 2.5). After the above operation, the position of the (M−1, 3) which is a predicted value of the a(M+1, 2) is obtained from the pixel value of the (M−1)-th field and the pixel value of the (M−2)-th field of which time position has been corrected. When a necessary pixel value is to be obtained by a weighted average, inversely proportional to a distance, from near-by pixel values, for example, a predicted value at the position of the (M−1, 3), that is, a predicted value of move compensation of the a(M+1, 2), is obtained by the following expression:

$$a(M-1, 4)/3 + 2*a(M-2, 3)/3$$

Although the above explains the prediction of move compensation of an image for only the vertical component, a similar operation is also applied to the case for predicting move compensation of an image having both vertical and horizontal components.

As described above, according to the second embodiment of the present invention, the above-described prediction of move compensation can be applied to a frame image, by using an interface signal as an input signal and by setting a reference image in two fields of a certain frame. As a result, there is an effect that it is possible to predict move compensation of an image at a high level of precision by using a frame as a base.

The above-described second embodiment also has a flexibility in the assumptions used, in the same manner as that of the first embodiment. For example, the number of reference frames, the positions of the reference frames, the assumptions for obtaining the MV adj (M) or MV adj (M+1) from either the MV(M) or the MV(M+1), the calculation method for obtaining a pixel value at a necessary position, and either interpolation or extrapolation, can also be selected freely. Further, although it is assumed in the present embodiment that a move vector for predicting move compensation can be obtained within the input image and reference frame and between fields of the same phase as that of the input image, it is also possible to obtain the move vector between fields of opposite phases, in the same manner of operation, with the similar effect. Further, when a position correction vector is obtained independent of a detection move vector, in the same manner as that of the first embodiment, there is an effect that it is possible to predict move compensation at a higher level of precision.

Figure 3:
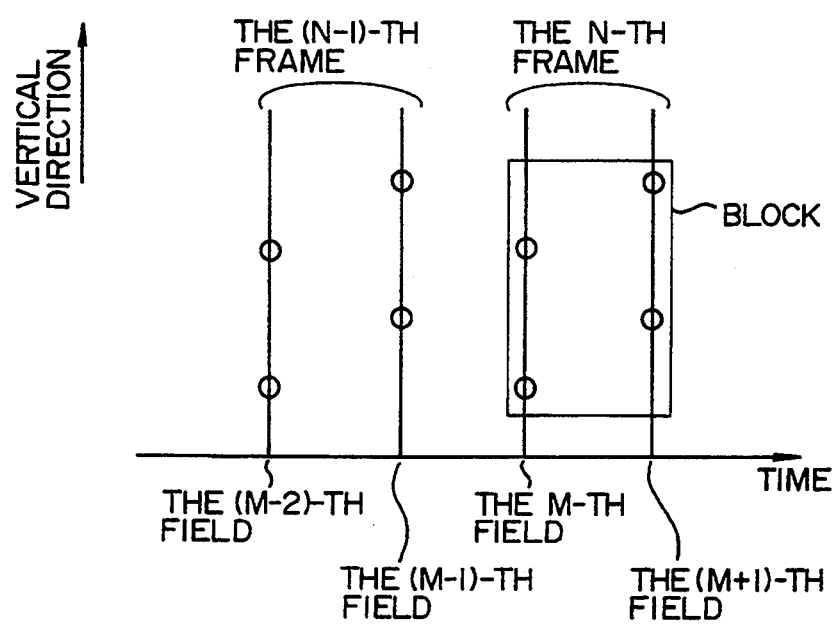
FIG. 3 is a diagram for explaining a block for predicting move compensation using a frame as a base.
Figure 4A:
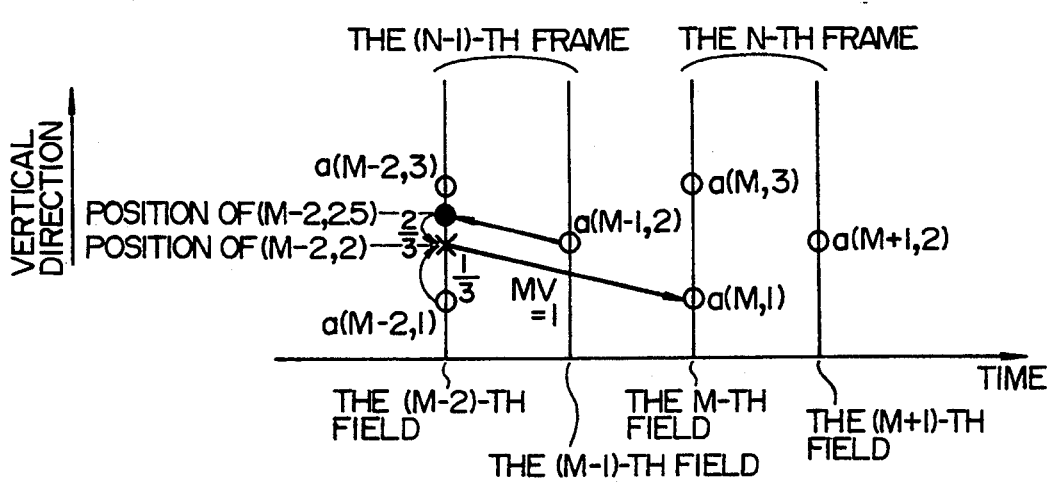
FIGS. 4A and 4B are diagrams for explaining the third embodiment of the present invention.
Figure 4B:
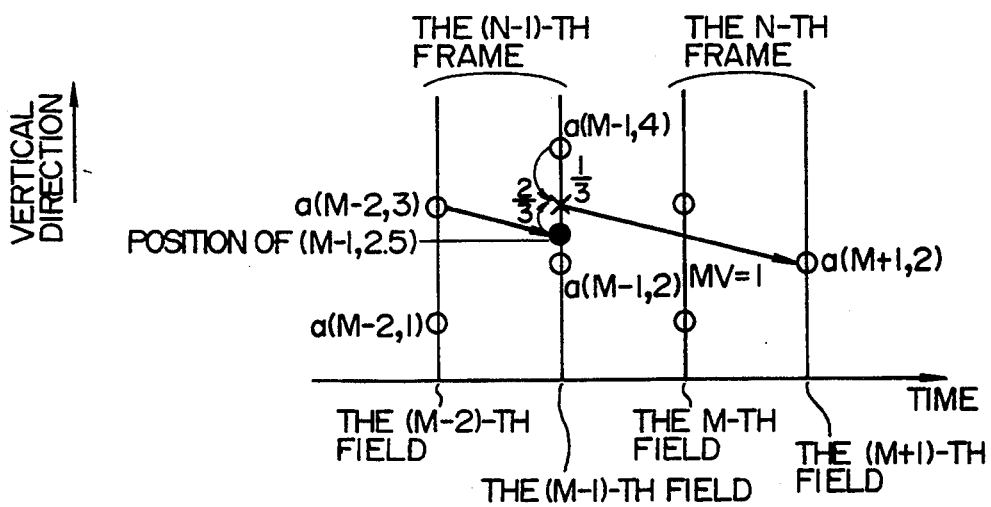

Next, as a third embodiment of the present invention, another method for predicting move compensation for an interlace input signal based on a frame unit will be explained. FIG. 3 and FIGS. 4A and 4B are diagrams for explaining the third embodiment of the present invention. Referring to FIG. 3, a reference image is in the (N−1)-th frame, that is, the (M−2) and (M−1) fields, and an input image is in the N-th frame, that is, the M-th and (M+1)-th fields. Now assume that a block for carrying out move compensation is being generated from the frame. Assume that a move vector MV is to be obtained in the block unit generated from the pixels of the N-th frame, from the (N−1)-th frame. The status of the block in this case is shown in FIG. 3. In terms of the method for predicting move compensation based on a field, the following method can be considered. The reference image is in the two fields of the (N−1)-th frame and the input image is in the two fields of the N-th frame. The detecting interval of the MV is the two-field interval. However, the pixels included in the above block have the same move vector MV for both the pixels in the M-th field and the pixels in the (M+1)-th field.

In other words, in the case of the third embodiment, move vectors to be used for pixels within a block generated from th above frame take the same value regardless of whether the pixels belong to the M-th field or the (M+1)-th field. The other operations become the same as those of the second embodiment. FIGS. 4A and 4B show the case that the vertical component of the MV is 1. Although the above explains the case of predicting move compensation of an image for only the vertical component, a similar operation is also carried out for the case of predicting move vector of an image having both vertical and horizontal components.

As described above, according to the third embodiment of the present invention, the same move vector is used for pixels in the two input fields positioned within a predetermined spacial area such as a block generated by the frame. Accordingly, it is not necessary to detect move vectors for each field according to this method, which also has an effect that it is possible to predict move compensation at a high level of precision.

The above-described third embodiment also has a flexibily in the assumptions used, similar to the case of the second embodiment. For example, th number of reference frames, the positions of the reference frames, the assumption for obtaining the MV adj from the MV, the calculation method for obtaining a pixel value at a necessary position, and whether interpolation or extrapolation is to be used, can all be selected freely. Although description has been made of the case for predicting move compensation based on a frame as a unit in the present embodiment, it is needless to mention that there is no change in the effect of prediction if the prediction is carried out based on a field as shown in the first embodiment or if the prediction is carried out based on a noninterlace image. Further, when a block to be used for having the same value of the move vector is selected from among blocks of a plurality of pieces of input images in such a way that the block selected is a block of each input image of which part or whole of the spatial position superposes with those of the other blocks selected, there is no change in the effect of prediction. Further, similar to the case of the second embodiment, by obtaining a position correction vector independent of a detection move vector, there is an effect that it is possible to predict move compensation at a higher level of precision.

Figure 5:
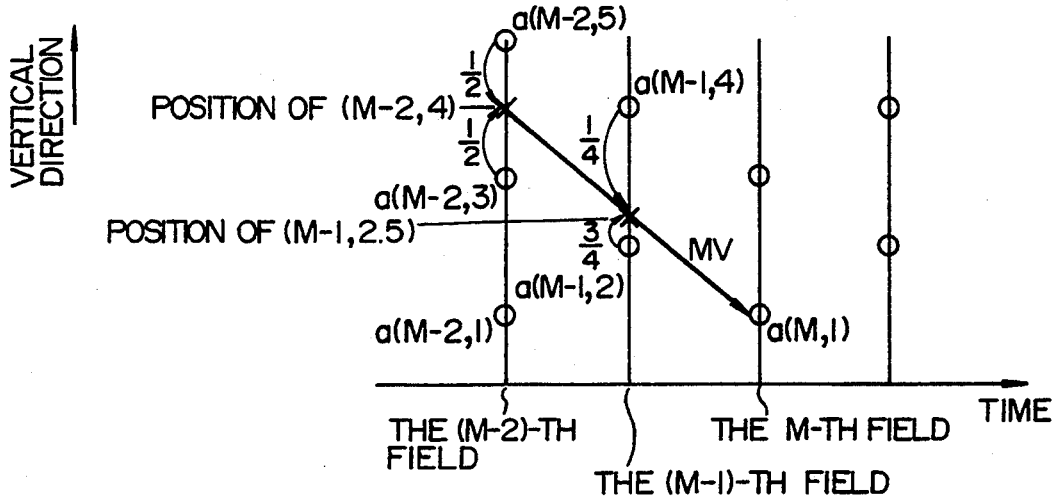
FIG. 5 is a diagram for explaining the fourth embodiment of the present invention.
Figure 6:
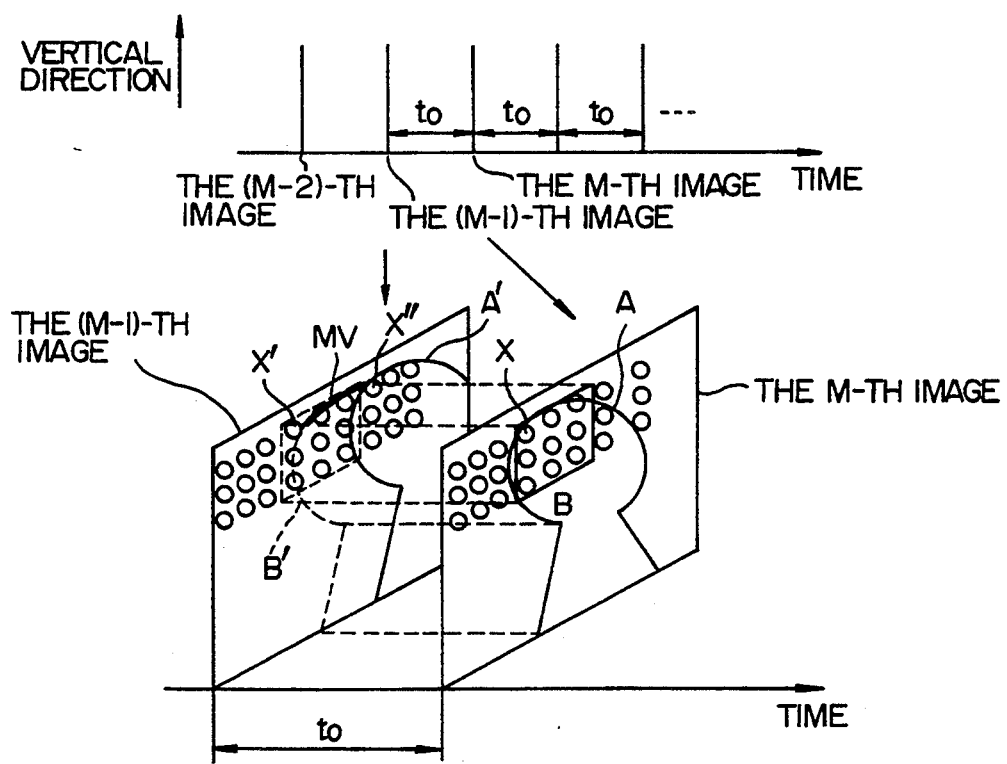
FIG. 6 is a conceptional diagram for showing the conventional method for predicting move compensation.
Figure 7A:
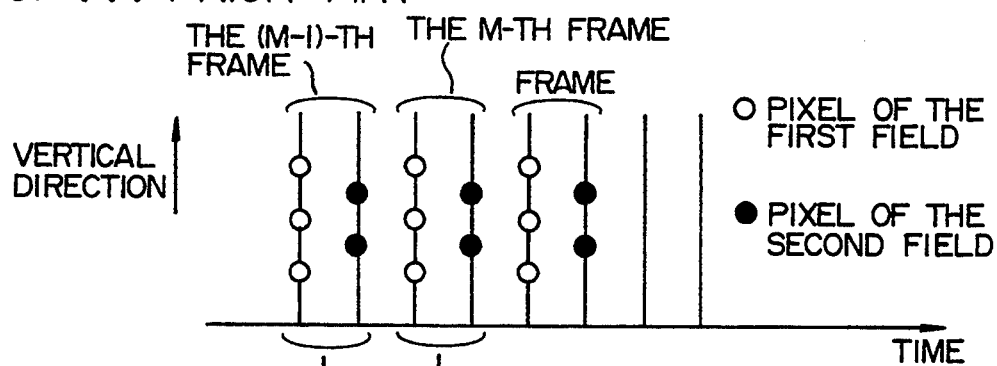
FIG. 7A to FIG. 7C are diagrams for explaining problems of the conventional method for predicting move compensation between frames.
Figure 7B:
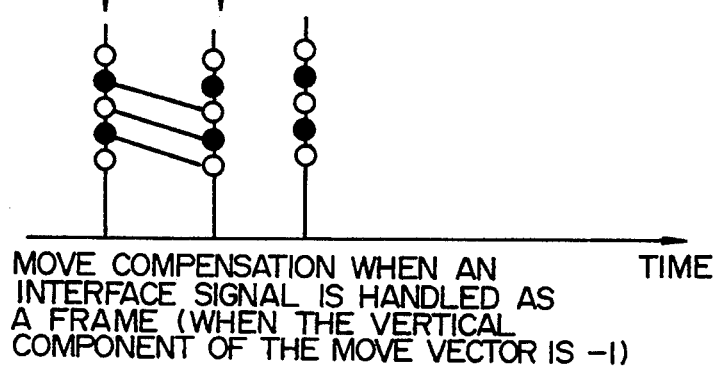
Figure 7C:
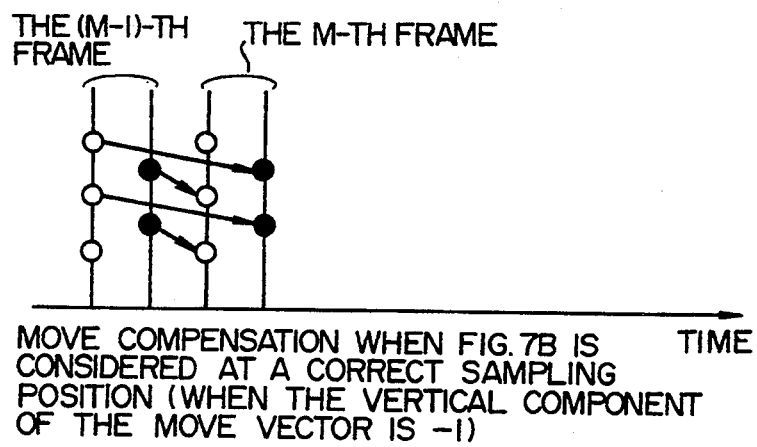
Figure 8:
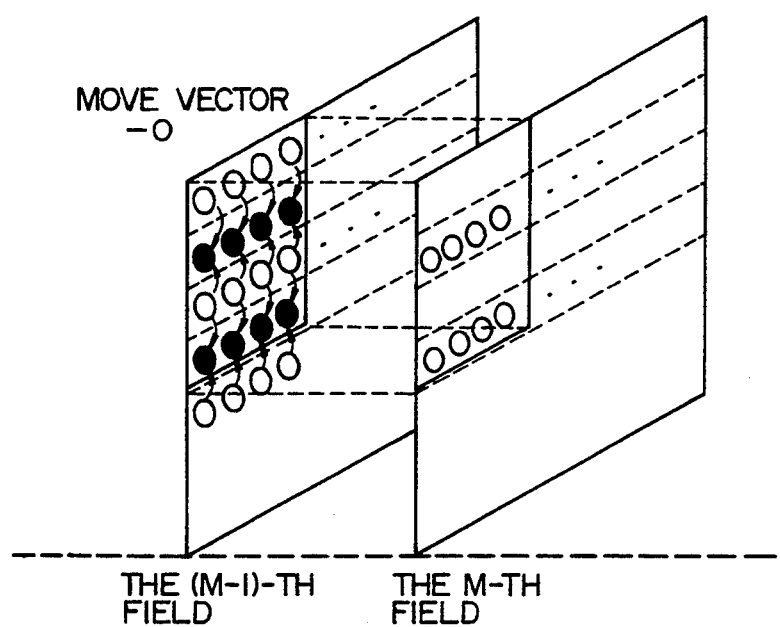
FIG. 8 is a diagram for explaining the conventional method for predicting move compensation between fields.

FIG. 5 is a diagram for explaining a fourth embodiment of the present invention. The fourth embodiment takes the same assumptions as those of the first embodiment, and an interlace signal is used as an input signal, an input image is in the M-th field and a reference image is in both the (M−1)-th field and the (M−2)-th field. Assume in FIG. 5 that a move vector (MV) for predicting move compensation of a certain block is to be detected in a two-field interval, that is, between the M-th field and the (M−2)-th field. To simplify the explanation, of the detected moves, only the move in a vertical direction will be considered, and a pixel value at each pixel position is expressed in the same manner as that of FIG. 1.

Now consider the case of obtaining a predicted value of a(M, 1). When it is assumed that the vertical component of the detected MV is 3, the predicted value of move compensation of the a(M, 1) becomes the pixel value at th position of (M−2, 4). First, this pixel value is obtained from the pixel value within the (M−2)-th field. When the pixel value is to be obtained based on a weighted average, inversely proportional to a distance, from near-by pixel values, for example, th pixel value at the position of the (M−2, 4) is obtained by the following expression:

$$a(M-2, 3)/2 + a(M-2, 5)/2$$

Next, based on the above MV, a move of the input image from the (M−1)-th field to the M-th field is calculated. The time difference between the M-th field and the (M−1)-th field is ½ of the time difference between the M-th field and the (M−2)-th field. Accordingly, this move vector can be considered to be MV/2. Since the vertical component of the MV is now 3, the vertical component of MV/2 becomes 1.5. Accordingly, when a predicted value of move compensation of the a(M, 1) is obtained from the image in the (M−1)-th field, this becomes the pixel value at the position of (M−1, 2.5). This pixel value is obtained from a pixel value within the (M−1)-th field. When the pixel value is to be obtained by a weighted average, inversely proportional to a distance, from near-by pixel values, for example, the pixel value at the position of (M−1, 2.5) can be obtained by the following expression:

$$3*a(M-1, 2)/4 + a(M-1, 4)/4$$

Based on the two predicted values obtained above, a mean of the two predicted values is obtained and the result is used as the predicted value of the a(M, 1).

Although the above explains the case for predicting move compensation of an image for only the vertical component, a similar operation is also carried out for the case of predicting move compensation of an image having both vertical and horizontal components.

As described above, according to the fourth embodiment of the present invention, a move of an input image from a plurality of pieces of reference images sampled at different times according to a detected move at certain time intervals of a block unit including at least one pixel is calculated based on the above detected move, and a pixel value at a position which has been compensated by the calculated move portion for each reference image is calculated, so that it is possible to obtain a plurality of predicted values of move compensation from the plurality of pieces of reference images. Since a predicted value of the input image is calculated from the plurality of predicted values, a noise can be eliminated if a noise is included in the predicted values, thus ensuring a prediction at a high precision level, of move compensation.

In the manner similar to the case of the first embodiment, it is also possible in the fourth embodiment to freely select the number of pieces of reference images, the positions of the reference images, the calculation method for obtaining a pixel value at a necessary position within each reference image, and either interpolation or extrapolation. For calculating predicted values from a plurality of pixel values obtained from the respective reference images, there are other alternative methods than a simple averaging method such as a weighted average method and a method for calculating by using a coefficient of a low-pass filter. Although description has been made of the case for predicting move compensation based on a field of an interlace signed in the present embodiment, it is needless to mention that the effect of the prediction does not change if a frame is used as a base or a noninterlace image is used as a base as shown in the second and third embodiments respectively.

According to the present invention, as is clear from the above-described embodiments, a time position of a reference image is corrected by using a move vector as required so that a plurality of pieces of reference images sampled at different times according to a detected move at certain time intervals of a block unit including at least one pixel become images at times separated from the input image by the above time intervals, so that it is possible to obtain a plurality of pieces of images at positions separated by the above time intervals from the input image. By combining the plurality of pieces of images together, a reference image of high pixel density can be obtained and a pixel value at a position which has been compensated by the detected move is calculated by using the reference image of high pixel density, so that the calculated pixel value is used as a predicted value. Thus, there is an effect that it is possible to predict move compensation of an image at a very high level of precision.

Further, according to the present invention, a vector for correcting a time position of the above reference image can be calculated based on a move detected at a certain time interval, which does not require a detection again of a move vector for correcting the time position, so that this has an effect that move compensation at a high precision level can be ensured. Further, since an interlace signal can be used as an input signal and a reference image can be in two fields of a certain frame, the above prediction of move compensation can be applied to a frame image, thus ensuring a prediction, at a high precision level, of move compensation based on a frame.

Further, since the same value can be used for a block of each input image among blocks of a plurality of pieces of input images, each block having its whole or part of spatial position superposed with that of the other blocks, as a move detected at a certain time interval of a block unit including at least one pixel, it is not necessary to carry out a plurality of detections of moves of many block in a plurality of input images so that there is an effect that a prediction of move compensation at a high precision level can be ensured.

We claim:

1. A method of predicting move compensation of an input image, said method comprising steps of:
   (a) sampling a reference image at a first time point, said reference image including a block unit comprising a plurality of pixels;
   (b) calculating a move vector of said input image, at a second time point, on a basis of movement of a block unit which is part of said input image, said block unit of said input image including a plurality of pixels;
   (c) calculating an adjustment vector for said reference image based on the move vector of said input image;
   (d) calculating a move vector of said reference image on a basis of said adjustment vector and movement of said block unit of said reference image which occurs at said first time point;
   (e) predicting the move compensation for said input image, at a desired time, based on (i) the move vector of said input image and (ii) the move vector of said reference image.

2. A method according to claim 1, wherein said step (a) comprises sampling said reference image at a plurality of sampling times, and said step (b) comprises calculating the move vector of said input image based on movement of said block unit of said reference image during said plurality of sampling times.

3. A method according to claim 2, wherein said step (e) comprises predicting at least one pixel value for said input image based on at least one pixel value of said reference image selected in accordance with the move vector of said input image and the move vector of said reference image.

4. A method according to claim 3, wherein said step of predicting said at least one pixel value for said input image includes weight averaging said at least one pixel value of said reference image.

5. A method according to claim 1, wherein said step (e) comprises predicting at least one pixel value for said input image based on at least one pixel value of said reference image selected in accordance with the move vector of said input image and the move vector of said reference image.

6. A method according to claim 5, wherein said step of predicting said at least one pixel value for said input image includes weight averaging said at least one pixel value of said reference image.

* * * * *